United States Patent Office 2,944,731
Patented July 12, 1960

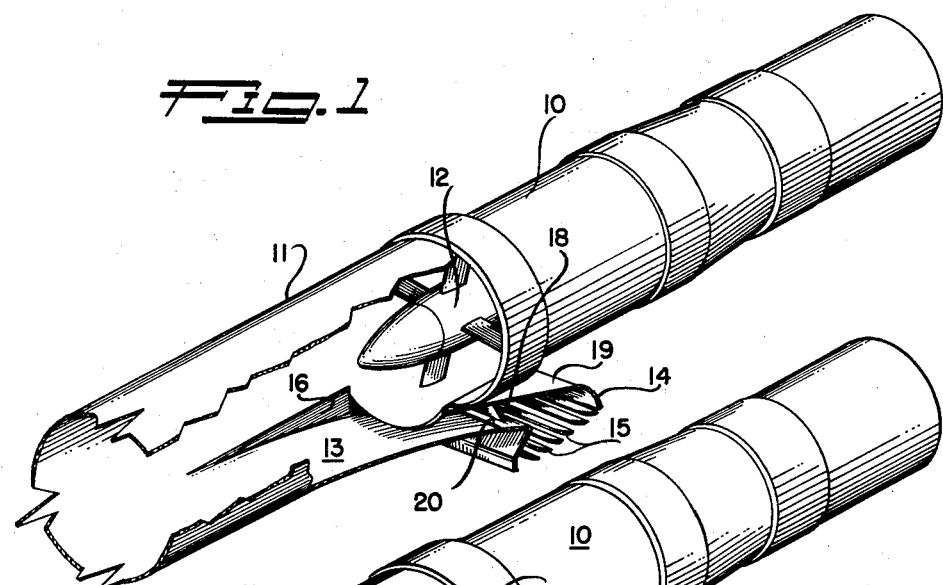
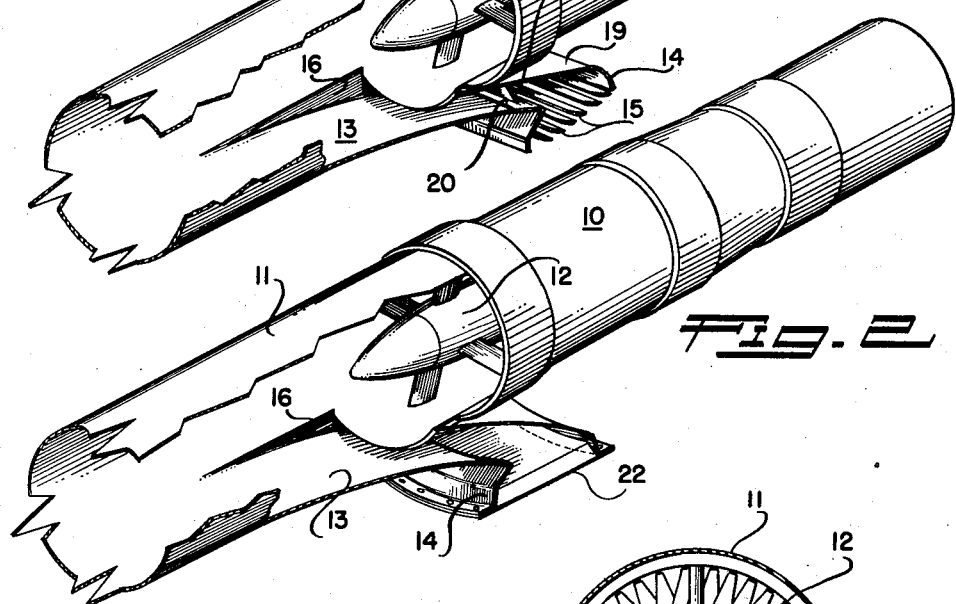
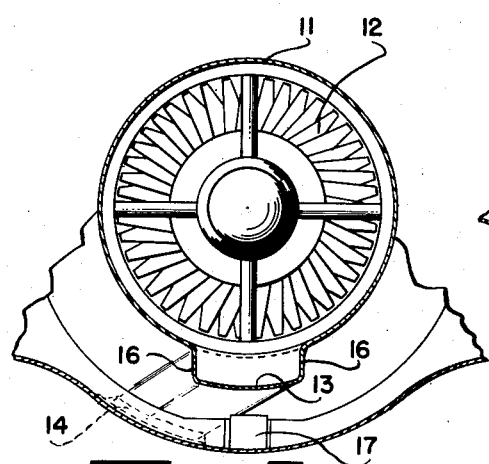
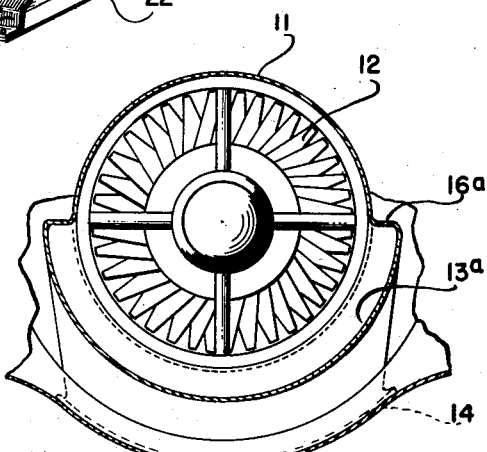

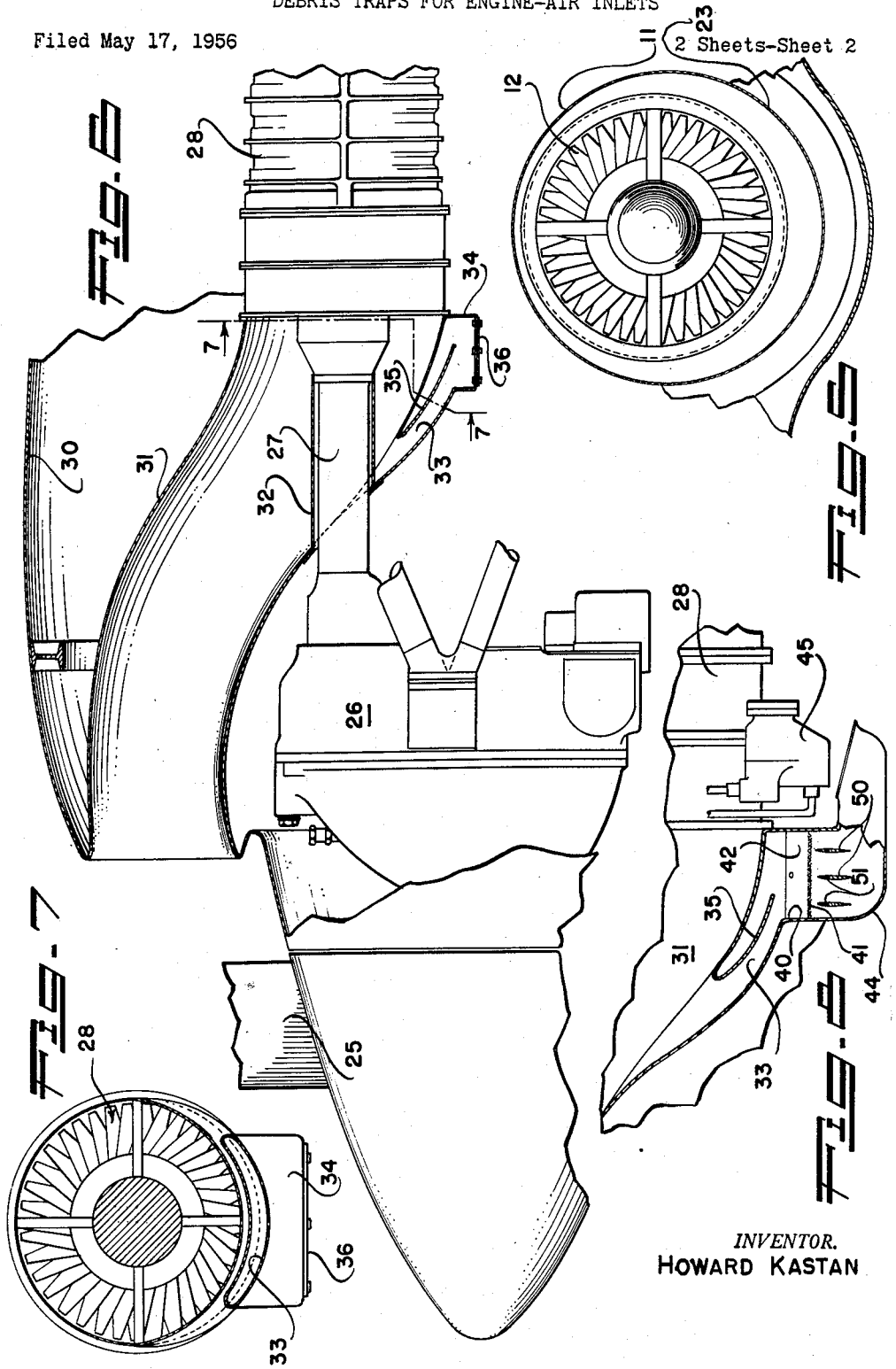

2,944,731

DEBRIS TRAPS FOR ENGINE-AIR INLETS

Howard Kastan, North Hollywood, Calif., assignor to Lockheed Aircraft Corporation, Burbank, Calif.

Filed May 17, 1956, Ser. No. 585,571

3 Claims. (Cl. 230—132)

This invention relates to protective devices for air inlet ducts and relates more particularly to sumps or traps for the air inlet ducts of turbine engines, ram jet engines, and the like.

Various types of devices have been proposed and introduced for use in or ahead of the air inlet ducts of gas turbine engines to prevent foreign objects from entering the engine proper where they may cause extensive damage to the blading and other parts. Grids or screens of both fixed and retractable types are representative of these earlier devices. Such object trapping devices as screens produce costly pressure drops in the air ducts, increase the fuel consumption or cause a drop in engine efficiency and impose substantial weight penalties, particularly where they require retracting mechanisms, and the like. The likelihood of such screens accumulating ice or arresting a rag or cloth in such a manner as to suddenly and dangerously interrupt air ingestion indicates that the use of protective screens or grids in the engine air inlets may introduce hazards of greater import or significance than the hazards they are intended to eliminate.

It is an object of the present invention to provide simple, practical sumps or traps for the air inlet ducts of turbine engines which are effective in preventing the ingestion of foreign objects and yet do not involve the penalties and disadvantages of the earlier proposed air inlet protective devices.

Another object of the invention is to provide a debris, sump or trap of this kind that is effective in preventing objects such as small hand tools, nuts, bolts, hail stones, and similar loose articles from being ingested by the engine. Experience has shown that engines are oftentimes severely damaged by the ingestion of wrenches, screw-drivers, and other hand tools, and by bolts, and the like, inadvertently left in the inlets by workmen servicing the engine or aircraft. Furthermore, small fasteners may work loose and fall into the air inlet duct, to be "drawn" into the engine. The sump or trap constructions of the invention serve to trap and retain such objects as well as large hail stones, sticks, and the like, to prevent them from entering the engine proper.

Another object of the invention is to provide debris traps of the character mentioned that do not involve screens, grids, or other structure in the path of the engine air flow to reduce ram pressure and accordingly to result in reduced engine efficiency, or that are likely to break loose and damage the engine or that ice up or become clogged with paper or cloth so as to be torn loose and subsequently enter the engine to damage the same. The devices of the engine leave the air inlet passage entirely unobstructed and do not embody parts or structure liable to work or break loose or in any way form a hazard.

A further object of the invention is to provide debris, sumps or traps of this kind that do not require de-icing provisions, that are light in weight and that may be inexpensively incorporated in the engine installation of the aircraft without in any way altering the aerodynamic contour of the aircraft.

A still further object of the invention is to provide debris traps or sump means that may serve as water traps or drains for the engine air inlet ducts and that may be vented in such a way that the vented air may be utilized as a cooling medium for cooling auxiliaries or utilized for other purposes.

Other objectives and features of the invention will become apparent from the following detailed description of typical preferred embodiments and applications of the invention throughout which description reference will be made to the accompanying drawings in which:

Figure 1 is a fragmentary perpsective view of an aircraft turbine engine, or the like, with a portion broken away to illustrate the air inlet duct and one form of vented trap means of the invention;

Figure 2 is a view similar to Figure 1 illustrating an unvented form of sump or trap of the invention;

Figure 3 is an enlarged transverse sectional view of a sump or trap means such as shown in Figures 1 and 2 showing a relatively narrow sump channel;

Figure 4 is a view similar to Figure 3 illustrating a sump ramp or channel of greater circumferential extent;

Figure 5 is a view similar to Figure 3 illustrating a sump or trap channel that is eccentric with respect to the air duct;

Figure 6 is a fragmentary sectional view of a portion of a turbo-prop engine installation illustrating a form of debris trap means of the invention incorporated therein;

Figure 7 is a transverse or vertical sectional view taken substantially as indicated by line 7—7 on Figure 6; and Figure 8 is a fragmentary sectional view of still another form of trap means illustrating the manner in which the vented air may be utilized to cool an engine accessory or other instrumentality.

The constructions or devices of the invention may be incorporated in or used in connection with engines of various kinds and may be designed to provide the optimum protection against the ingestion of foreign articles with the minimum penalty in engine operating efficiency. In the drawings I have shown several forms and applications of the invention and it is to be understood that these are merely exemplary or illustrative and are not intended to restrict the invention to the particular configurations or applications shown.

In Figure 1, I have shown a gas turbine engine of the axial flow type having an engine casing 10 provided at its forward end with an air intake duct 11 leading to the engine compressor 12. The duct 11 receives ram air and delivers or conducts it to the compressor. I have shown the duct 11 in the form of a simple cylindrical tube. In accordance with the invention the debris sump or trap means is associated with the duct 11 ahead of or upstream from the compressor 12. The trap entrance is shown immediately ahead of the compressor and comprises a sloping entrance or ramp 13 merging at its forward end with the cylindrical internal wall of the duct 11 and sloping rearwardly and downwardly therefrom. The ramp 13 leads to the sump or trap 14 which may be spaced below the engine 10. In this particular installation the trap 14 is vented, being provided at its bottom with a plurality of bars, slats or louvers 15 for retaining the larger trapped articles and permitting a limited air flow through the trap system. The side walls 16 of the ramp 13 may be substantially vertical and generally parallel or they may be rearwardly divergent as desired.

In Figure 3 the ramp or channel 13 is shown sloping or pitched to one side to be clear of structural elements 17 of the airframe. The trap entrance channel or ramp may be relatively narrow, as shown in Figure 3, or may be of considerable circumferential extent, as shown in Figure 4, where the ramp and side walls are designated 13ᵃ and 16ᵃ respectively. In any case, the combination of gravity and air movement cause the foreign objects to move downwardly and rearwardly through the sump entrance into the trap 14.

In order to prevent a reverse or forward air flow through the trap or sump system during ground engine operations I provide a valve or door 18 at the trap. The upper wall 19 of the trap 14 slopes upwardly and forwardly to smoothly merge with the cylindrically curved wall of the duct 11 and the door 18 is hinged at its upper edge to the wall 19. The force of gravity and the forward air flow through the trap 14 closes the door 18 forwardly against a ridge 20 on the ramp 13 during engine run-up and ground operations to prevent any substantial air flow forwardly through the trap system when the air pressure in the duct 11 ahead of the engine is less than the ambient atmospheric pressure. During flight the limited air flow rearwardly through the sump or trap system will open the door 18 and the freely hinged door does not interfere with the free passage of foreign objects into the trap 14.

The sump or trap system of Figure 2 is substantially the same as that shown in Figure 1. However, in this embodiment of the invention the bottom or lower side of the trap 14 is closed by a removable cover or plate 22. The plate 22 may be removed periodically for inspection purposes and to permit the removal of any objects that may have been trapped in the sump system. Since the plate 22 closes the trap 14 against air flow there is no need to employ the valve or door 18 in this embodiment of the invention.

Figure 5 illustrates a ramp or sump wall 23 corresponding with the ramp 13 of Figure 1. In this construction the wall 23 is circular or annular and is eccentric with relation to the engine air inlet duct 11. The central longitudinal axis of the slot or ramp 23 is spaced below the axis of the duct 11 so that foreign objects may readily roll, tumble, or otherwise move rearwardly and downwardly through the sump entrance into the trap 14. It is to be understood that the sump entrance configurations of Figures 1, 2, 3, 4 and 5 may be employed in the various forms and applications of the invention to adapt the invention for use with various engines and aircraft installations.

The operation of the debris trap means of Figures 1 to 5 inclusive will be apparent from the foregoing description. If the foreign object or article is in or enters the air engine duct 11 during engine operation the force of gravity and the relatively high velocity air flow in the duct will move the object aft and downwardly into the trap entrance defined by the ramp and walls 13 and 16 or 13ᵃ and 16ᵃ or 23, as the case may be, and the object falls into the trap 14. In this manner hand tools, fastening devices such as nuts and bolts, large hail stones, and the like, as well as water that may be present in or may enter the duct 11 are prevented from being ingested by the engine. The trap devices or systems have a minimum effect on engine efficiency. The main air flow through the duct 11 is disturbed to a minimum extent since the wall 19 smoothly merges with and fairs into the wall of the duct 11 at the rear of the slot-like sump entrance to re-establish full regular duct contour and the sump entrance is such as to produce a minimum of air turbulence and friction losses in the duct.

Figures 6, 7 and 8 show the invention associated with a turbo-prop engine installation. In Figures 6 and 7 the propeller 25 is ahead of and driven by the gear box 26 and the engine drive shaft 27 enters the gear box adjacent its upper rear extremity. The engine 28 is spaced aft from the gear box 26 and is housed within a nacelle, fuselage or other airframe component 30. The air inlet duct 31 of the engine has its ram or entrance at the forward end of the nacelle or fuselage 30 and curves downwardly and rearwardly to the engine proper 28. A suitable sleeve or tube 32 surrounds the shaft 27 where it passes forwardly through the air duct 31. In this application of the invention the debris sump or trap has a passage or ramp 33 communicating with the lower wall of the downwardly curving duct 31 some distance ahead of but adjacent the forward end of the engine 28. As shown in Figure 7, the sump ramp 33 is in the nature of a horizontally elongated passage or duct which may be arcuate to conform with the generally cylindrical configuration of the main air duct 31. The sump ramp 33 curves or slopes steeply or abruptly downwardly and rearwardly to a trap 34. The top wall 35 of the channel or ramp 33 smoothly fairs into the downwardly and rearwardly curving wall of the air duct 31 to reduce air turbulence and friction losses to a minimum. The trap 34, which may be ahead of and below the engine 28, is closed by a removable plate 36. The plate 36 may be readily removed periodically to permit removal of articles caught in the trap 34.

The embodiment of the invention shown in Figure 8 provides for a limited flow of air through the trap system and utilizes this air as a cooling medium for an oil cooler, electrical generator, or other accessory. The ramp 33 may be the same as in Figures 6 and 7 and leads to a trap 40 having a screen 41 extending across its lower side. A removable door 42 in the wall of the trap 40 permits removal of articles caught on the screen. An air duct 44 leads from the screen 41 or the trap 40 to an accessory device 45. The air which bleeds through the trap system flows through the duct 44 to cool the accessory 45. The trap 40 or the duct 44 is designed to retain water and small articles that may be received by the trap system so they cannot reach the accessory device 45. It is desirable to prevent a reverse or forward flow of air through the trap system during ground operations of the engine 28. For this purpose I provide a series of butterfly valves 50 of airfoil cross section in the duct 44 below the screen 41. The valves 50 are supported by hinge rods or pivots 51 to swing or pivot between the open positions shown in Figure 8 and closed positions where they close off the duct 44. The pivots 51 are offset with respect to the central axes of the valves 50 so the valves normally hang by gravity in their open positions illustrated. Furthermore, the rearward flow of air through the trap system assists in retaining the valves 50 in their open positions. However in the event of reverse or forward air flow through the trap system as during engine ground operations, the air flow acts on the eccentrically mounted valves 50 to swing them to closed positions where they prevent any substantial reverse flow through the trap 40.

The debris trap or sump systems of Figures 6, 7 and 8 operate in substantially the same manner as the previously described devices. Where the entrance ramp 33 is in communication with the downwardly curving lower wall of the engine inlet duct 31 it serves to trap water, hail, and small foreign objects that may enter the duct. Furthermore, the ramp or trap entrance 33 is constructed and arranged to dependably receive hand tools, fasteners, and other objects that may inadvertently be left in the engine inlet duct or that may fall therein. It will be noted that the debris trap system interferes to a minimum degree with the free, unobstructed flow of air into the engine 28. The various forms or embodiments of the invention are light in weight, require little or no modification of the basic engine installation, cannot interfere with the unobstructed flow of ram air to the engine compressor and require few, if any, moving parts. The devices do not require the employment of any small elements, devices or fasteners that might come loose and enter the engine.

Having described only typical forms of the invention I do not wish to be limited to the specific details herein set forth, but wish to reserve to myself any variations or modifications that may appear to those skilled in the art and fall within the scope of the following claims.

I claim:

1. An aircraft air-ingesting engine air inlet comprising an air inlet longitudinally extending tubular duct having a smooth non-irregular generally cylindrical inside configuration, a debris trap secured beneath said duct in advance of said engine, the bottom of said tubular duct having an opening positioned in advance of said trap, a trap duct connecting said trap and said opening, the walls of said trap duct sloping forwardly and upwardly from said trap, the bottom and side walls of said trap duct forming a channel at the upper end of said trap duct and merging with the front and side edges of said opening, said trap duct side walls increasing in height gradually from front to rear, and said top wall of said trap duct connecting the rear edge of said opening.

2. An aircraft air-ingesting engine air inlet as in claim 1 and having said trap duct pitched from front to rear to one side of the longitudinal axis of said tubular duct.

3. An aircraft air-ingesting engine air inlet as in claim 1 and having a flap valve at the forward end of said trap duct and connected to the top wall of said trap duct.

References Cited in the file of this patent

UNITED STATES PATENTS

| | | |
|---|---|---|
| 1,838,117 | Simms et al. | Dec. 29, 1931 |
| 2,047,568 | Lissman | July 19, 1936 |
| 2,288,734 | Noack | July 7, 1942 |
| 2,600,302 | Kinsella | June 10, 1952 |
| 2,636,666 | Lombard | Apr. 28, 1953 |
| 2,735,612 | Hausmann | Feb. 21, 1956 |
| 2,750,737 | Leigh | June 19, 1956 |
| 2,802,618 | Pracher | Aug. 13, 1957 |